United States Patent
Choi

(10) Patent No.: US 10,168,755 B2
(45) Date of Patent: Jan. 1, 2019

(54) PORTABLE ELECTRONIC DEVICE HAVING POWER MAINTENANCE FUNCTION DURING REPLACEMENT OF BATTERY

(71) Applicant: Su Seon Choi, Seoul (KR)

(72) Inventor: Su Seon Choi, Seoul (KR)

(73) Assignee: Su Seon Choi, Seoul (KR)

( * ) Notice: Subject to any disclaimer, the term of this patent is extended or adjusted under 35 U.S.C. 154(b) by 0 days.

(21) Appl. No.: 15/030,584

(22) PCT Filed: Apr. 24, 2015

(86) PCT No.: PCT/KR2015/004119
§ 371 (c)(1),
(2) Date: Apr. 19, 2016

(87) PCT Pub. No.: WO2015/167173
PCT Pub. Date: Nov. 5, 2015

(65) Prior Publication Data
US 2017/0038808 A1    Feb. 9, 2017

(30) Foreign Application Priority Data
Apr. 28, 2014    (KR) .................. 10-2014-0051130

(51) Int. Cl.
*G06F 11/00* (2006.01)
*G06F 1/26* (2006.01)
(Continued)

(52) U.S. Cl.
CPC ............ *G06F 1/263* (2013.01); *G06F 1/1626* (2013.01); *G06F 1/1635* (2013.01); *G06F 1/26* (2013.01);
(Continued)

(58) Field of Classification Search
CPC .................................................. G06F 11/2015
See application file for complete search history.

(56) References Cited

U.S. PATENT DOCUMENTS 5,347,163 A * 9/1994 Yoshimura ............. G11C 5/141
307/150
5,369,802 A * 11/1994 Murray ............... H01M 2/1044
340/7.63
(Continued)

FOREIGN PATENT DOCUMENTS

CN        102004538 A    4/2011
CN        102339117 A    2/2012
(Continued)

OTHER PUBLICATIONS

WO2014023224(A1), Jin, Feb. 13, 2014, Espacenet Translation.*
International Search Report for PCT/KR2015/004119.

*Primary Examiner* — Christopher S McCarthy
(74) *Attorney, Agent, or Firm* — The PL Law Group, PLLC

(57) ABSTRACT

The present invention provides a portable electronic device having a power maintenance function during replacement of a battery which includes a main body forming an appearance of a portable electronic device, and a battery for supplying a main power which is detachably connected to the main body, and is configured to be charged by an external power and supply the main power to the portable electronic device, wherein the main body includes an auxiliary power supply module, a power control circuit, first terminals connected with switching terminals and the battery for supplying a main power, and second terminals connected with the auxiliary power supply module, such that it is possible to simply and efficiently maintain and control a power supply through a structure of connection terminals even while using a conventional battery contact system.

11 Claims, 4 Drawing Sheets

(51) Int. Cl.
    *G06F 1/32*    (2006.01)
    *G06F 1/16*    (2006.01)
    *H01M 2/34*    (2006.01)
    *H02J 7/00*    (2006.01)
    *H04B 1/3883*  (2015.01)
    *H04M 1/02*    (2006.01)

(52) U.S. Cl.
    CPC ............ *G06F 1/3287* (2013.01); *H01M 2/34* (2013.01); *H02J 7/0045* (2013.01); *H04B 1/3883* (2013.01); *H04M 1/0262* (2013.01)

(56) References Cited

U.S. PATENT DOCUMENTS

| | | | | |
|---|---|---|---|---|
| 6,936,376 | B2* | 8/2005 | Plumadore | H01M 2/1066 429/96 |
| 7,339,349 | B2* | 3/2008 | Kok | H01M 2/1066 320/110 |
| 9,660,224 | B2* | 5/2017 | Wang | H01M 2/0212 |
| 2004/0196599 | A1* | 10/2004 | Kim | H01M 2/1066 361/18 |
| 2005/0062478 | A1* | 3/2005 | Tanaka | H01R 13/26 324/363 |
| 2006/0115689 | A1* | 6/2006 | Lee | H01M 2/1066 429/9 |
| 2010/0130263 | A1* | 5/2010 | Zhang | H04B 1/3883 455/572 |
| 2012/0322431 | A1* | 12/2012 | Kil | H02J 9/06 455/418 |
| 2014/0129862 | A1* | 5/2014 | Kil | H02J 9/06 713/323 |
| 2014/0176046 | A1* | 6/2014 | Park | H02J 7/0024 320/103 |
| 2016/0204640 | A1* | 7/2016 | Kwak | H02J 7/0091 455/573 |

FOREIGN PATENT DOCUMENTS

| | | |
|---|---|---|
| CN | 103581371 A | 2/2014 |
| JP | H5-38057 A | 2/1993 |
| JP | H5-45511 U | 6/1993 |
| JP | H5-244733 A | 9/1993 |
| JP | H9-84273 A | 3/1997 |
| JP | H10-304584 A | 11/1998 |
| KR | 20-2003-0032216 B1 | 1/2004 |
| KR | 10-2006-0030781 A | 4/2006 |
| KR | 10-2007-0066463 A | 6/2007 |
| KR | 10-2010-0040094 A | 4/2010 |
| KR | 10-2012-0140429 A | 12/2012 |

* cited by examiner

PORTABLE ELECTRONIC DEVICE HAVING POWER MAINTENANCE FUNCTION DURING REPLACEMENT OF BATTERY

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/004119, filed Apr. 24, 2015, which claims priority to the benefit of Korean Patent Application No. 10-2014-0051130 filed in the Korean Intellectual Property Office on Apr. 28, 2014, the entire contents of which are incorporated herein by reference.

TECHNICAL FIELD

The present invention relates to a portable electronic device, and more particularly, to a portable electronic device having a power maintenance function during replacement of a battery.

BACKGROUND ART

A portable electronic device means an electronic device designed for portable use, such as mobile phones, camcorders, PDAs, PMPs, smart pads, tablet PCs, notebooks, and is generally supplied with a power through a battery. Recently, due to the development of smart technologies, the portable electronic device began to perform multiple functions, and due to the introduction of touch screen technologies, the size of a liquid crystal screen has gradually become larger, such that a power supply for the portable electronic device has emerged as an important issue. Therefore, a high-capacity battery has been developed, but there is a limit to increase a capacity of the battery in terms of maintaining portability. Thereby, electronic device companies typically provide a spare battery which is configured and employed for allowing a user to carry and replace the discharged battery with the spare battery, as necessary. In a case of employing a system of replacing the battery, it is not possible to use the portable electronic device during times of replacing the battery, and there is an inconvenience that a time is required for booting up the electronic device upon turning on and off the same. In particular, in the case of a mobile phone, the user may not receive an important call while replacing the battery, and a variety of programs should be restarted, such that it takes a very long time to boot up the mobile phone.

Thereby, research into how to maintain the power even when replacing the battery has been actively proceeded in recent years. Korean Utility Model Registration Application No. 20-2003-0032216 discloses a structure configured in such a manner that slide guiding grooves are formed in a battery mounting part of a mobile phone, a battery slides along the guiding grooves so as to be attached or detached to or from the battery mounting part, and during sliding the battery along the guiding grooves, power supply terminals of the battery that has reached a potential of end-stage of use may be maintained in a state of contacting power supply terminals of the mobile phone when inserting a new battery into the guiding grooves and sliding the same, until power supply terminals of the new battery come into contact with the power supply terminals of the mobile phone. However, this method has problems that, since another battery should be inserted into the guiding groves with only a portion of the previously mounted battery being separated from the battery mounting part, the battery replacement method is not easy, and applying the method to a currently largely used battery contact structure is difficult. Further, a variety of methods for supplying an auxiliary power to the mobile phone has been studied, but a specific method for allowing the mobile phone to have a power maintenance function while using the conventional battery contact system has not been developed up to now.

SUMMURY

In consideration of the above-mentioned problems entailed in the existing proposed methods, it is an object of the present invention to provide a portable electronic device having a power maintenance function during replacement of a battery which includes a main body forming an appearance of a portable electronic device, and a battery for supplying a main power which is detachably connected to the main body, and is configured to be charged by an external power and supply the main power to the portable electronic device, wherein the main body includes an auxiliary power supply module, a power control circuit, first terminals connected with switching terminals and the battery for supplying a main power, and second terminals connected with the auxiliary power supply module, such that it is possible to simply and efficiently maintain and control a power supply through a structure of connection terminals even while using a conventional battery contact system.

In order to achieve the above-described object, according to one aspect of the present invention, there is provided a portable electronic device having a power maintenance function during replacement of a battery including:

a main body 100 which forms an appearance of a portable electronic device; and a battery 200 for supplying a main power which is detachably connected to the main body 100, and is configured to be charged by an external power and supply the main power to the portable electronic device, wherein the main body 100 includes:

an auxiliary power supply module 110 which is fixedly provided inside of the main body 100, and is configured to supply an auxiliary power to the portable electronic device, when the battery 200 for supplying a main power is separated from the main body 100;

a power control circuit 120 configured to control a power supply to the portable electronic device;

switching terminals 130 configured to connect the power control circuit 120 with the battery 200 for supplying a main power or the auxiliary power supply module 110;

first terminals 140 configured to, when the battery 200 for supplying a main power is connected to the main body 100, contact with connection terminals 210 of the battery 200 for supplying a main power and the switching terminals 130 to connect the battery 200 for supplying a main power with the power control circuit 120; and second terminals 150 which are provided in the auxiliary power supply module 110 to be connected therewith, and are configured to, when the battery 200 for supplying a main power is separated from the main body, contact with the switching terminals 130 to connect the auxiliary power supply module 110 with the power control circuit 120.

Preferably, the switching terminal 130 is formed by bending conductive metal having self-elasticity, is configured to, when the battery 200 for supplying a main power is separated from the main body 100, be in contact with the second terminal 150, and is configured to, when the battery 200 for supplying a main power is connected to the main body 100, be pressed together with the first terminal 140 by the connection terminal 210 of the battery 200 for supplying a main power so as to deform a shape thereof, and be disconnected from the second terminal 150.

Preferably, the first terminal 140 is formed by bending conductive metal having self-elasticity, is provided by protruding at a point corresponding to the connection terminal 210 of the battery 200 for supplying a main power, and is configured to, when being pressed by the connection terminal 210 of the battery 200 for supplying a main power, be pushed inside of the main body 100 so as to contact with the switching terminal 130.

Preferably, the second terminal 150 is provided at a point corresponding to the switching terminal 130, and is formed by bending in an "L" shape.

Preferably, the auxiliary power supply module 110 further includes a third terminal 151 which contacts with a connection terminal 220 of the battery 200 for supplying a main power, and is configured to receive and store a power from the battery 200 for supplying a main power through the third terminal 151.

Preferably, the auxiliary power supply module 110 is configured to store the power to an extent of maintaining the power-on state of the portable electronic device for 10 to 30 seconds.

According to the portable electronic device having a power maintenance function during replacement of a battery proposed in the present invention, the devices includes the main body forming an appearance of the portable electronic device, and the battery for supplying a main power which is detachably connected to the main body, and is configured to be charged by an external power and supply the main power to the portable electronic device, wherein the main body includes the auxiliary power supply module, the power control circuit, the first terminals connected with the switching terminals and the battery for supplying a main power, and the second terminals connected with the auxiliary power supply module, such that it is possible to simply and efficiently maintain and control a power supply through the structure of connection terminals even while using a conventional battery contact system.

DESCRIPTION OF REFERENCE NUMERALS

Figure 1:
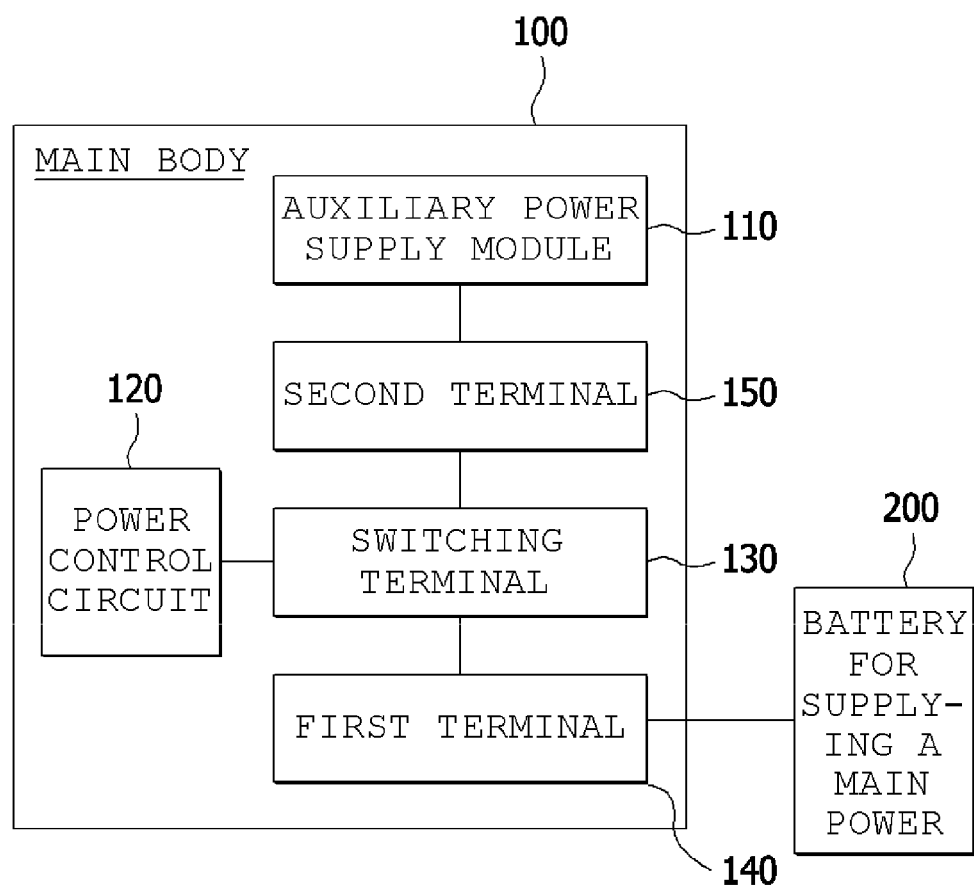
FIG. 1 is a block diagram illustrating a configuration of a portable electronic device having a power maintenance function during replacement of a battery according to one embodiment of the present invention.

100: main body, 110: auxiliary power supply module
120: power control circuit, 130: switching terminal
140: first terminal, 150: second terminal
151: third terminal, 200: battery for supplying a main power
210, 220: connection terminal of battery for supplying a main power

DETIALED DESCRIPTION

Hereinafter, embodiments of the present invention will be described in detail with reference to the accompanying drawings so that they can be easily practiced by those skilled in the art to which the present invention pertains. However, in description of preferred embodiments of the present invention, the publicly known functions and configurations that are judged to be able to make the purport of the present invention unnecessarily obscure will not be described in detail. In addition, identical or similar reference numerals will be denoted to portions performing similar functions and operations throughout the accompanying drawings.

Further, throughout the present disclosure, when any one part is referred to as being "connected with" another part, it means that any one part and another part are "directly connected with" each other or are "indirectly connected with" each other with the other part interposed therebetween. In addition, unless explicitly described to the contrary, "comprising" any components will be understood to imply the inclusion of other elements rather than the exclusion of any other elements.

Figure 2:
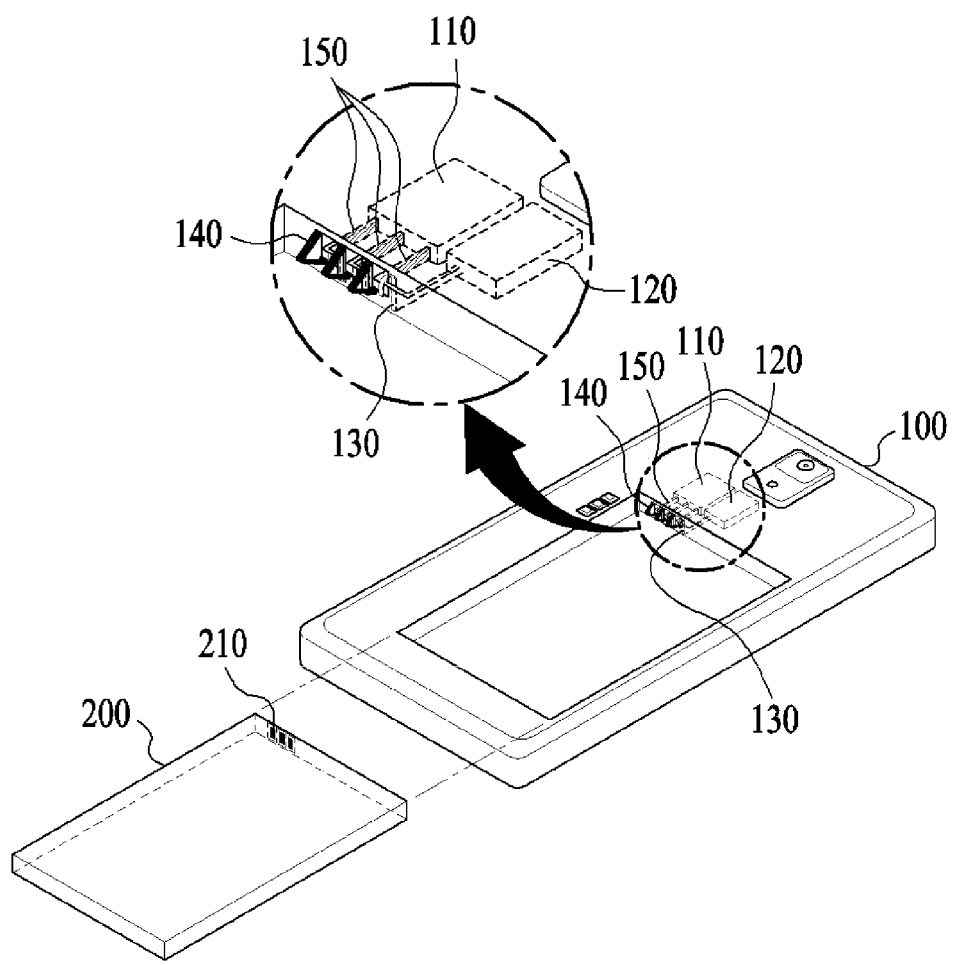
FIG. 2 is a perspective view illustrating the portable electronic device having a power maintenance function during replacement of a battery according to one embodiment of the present invention.

FIG. 1 is a block diagram illustrating a configuration of a portable electronic device having a power maintenance function during replacement of a battery according to one embodiment of the present invention. As illustrated in FIG. 1, the portable electronic device having a power maintenance function during replacement of a battery includes a main body 100 which forms an appearance of a portable electronic device, and a battery 200 for supplying a main power which is detachably connected to the main body 100 and is configured to be charged by an external power and supply the main power to the portable electronic device. Herein, the main body 100 includes an auxiliary power supply module 110, a power control circuit 120, switching terminals 130, first terminals 140, and second terminals 150. Thereby, in accordance with a separation or connection of the battery 200 for supplying a main power from or to the main body, it is possible to control a power supply. That is, when separating the battery 200 for supplying a main power from the main body, the device may be temporarily supplied with a power from the auxiliary power supply module 110 through the second terminals 150, the switching terminals 130, and the power control circuit 120. Hereinafter, each component FIG. 2 is a perspective view illustrating the portable electronic device having a power maintenance function during replacement of a battery according to one embodiment of the present invention. As illustrated in FIG. 2, in the portable electronic device having a power maintenance function during replacement of a battery according to one embodiment of the present invention, the auxiliary power supply module 110 is fixedly provided inside of the main body 100. When the battery 200 for supplying a main power is separated from the main body 100, the auxiliary power supply module may supply an auxiliary power to the portable electronic device. The auxiliary power supply module 110 is configured to temporarily supply the power during replacement of the battery, such that it is sufficient to store the power to an extent of maintaining the power-on state of the portable electronic device for 10 to 30 seconds. When storing a high-capacity power, since it may affect a size and a weight of the electronic device, it is preferable that the auxiliary power supply module is configured so as to store only minimum power.

The power control circuit 120 may control the power supply to the portable electronic device, and the switching terminals 130 may connect the power control circuit 120 to the battery 200 for supplying a main power or the auxiliary power supply module 110. That is, when the switching terminal 130 contacts with any one of the battery 200 for supplying a main power and the auxiliary power supply module 110, the power control circuit 120 may control the power supply to the portable electronic device using the power supplied thereto.

When the battery 200 for supplying a main power is connected to the main body 100, the first terminals 140 may contact with connection terminals 210 of the battery 200 for supplying a main power and the switching terminals 130 to connect the battery 200 for supplying a main power with the power control circuit 120.

The second terminals 150 are provided in the auxiliary power supply module 110 to be connected therewith. When the battery 200 for supplying a main power is separated from the main body, the second terminals may contact with the switching terminals 130 to connect the auxiliary power supply module 110 with the power control circuit 120.

Figure 3:
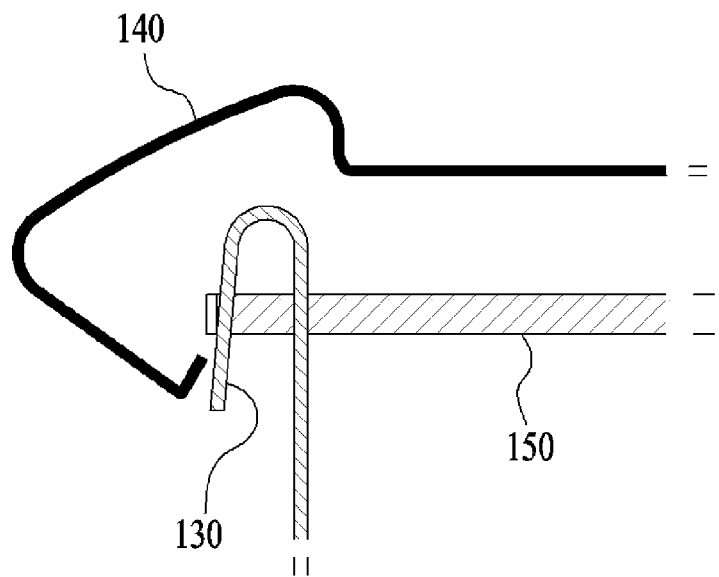
FIG. 3 is a cross-sectional view illustrating an operational structure of a switching terminal, a first terminal and a second terminal when a battery for supplying a main power is separated from a main body, in the portable electronic device having a power maintenance function during replacement of a battery according to one embodiment of the present invention.
Figure 4:
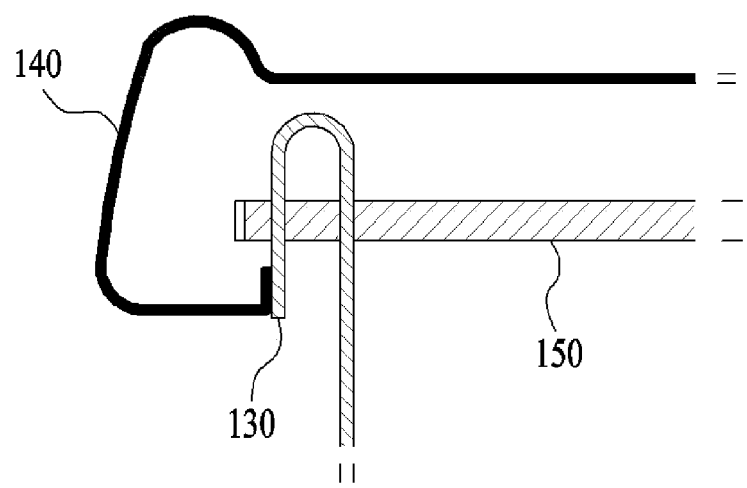
FIG. 4 is a cross-sectional view illustrating an operational structure of the switching terminal, the first terminal and the second terminal when the battery for supplying a main power is connected to the main body, in the portable electronic device having a power maintenance function during replacement of a battery according to one embodiment of the present invention.

FIG. 3 is a cross-sectional view illustrating an operational structure of the switching terminal, the first terminal and the second terminal when the battery for supplying a main power is separated from the main body, in the portable electronic device having a power maintenance function during replacement of a battery according to one embodiment of the present invention, and FIG. 4 is a cross-sectional view illustrating an operational structure of the switching terminal, the first terminal and the second terminal when the battery for supplying a main power is connected to the main body, in the portable electronic device having a power maintenance function during replacement of a battery according to one embodiment of the present invention. As illustrated in FIG. 3, the switching terminal 130 is formed by bending conductive metal having self-elasticity. When the battery 200 for supplying a main power is separated from the main body 100, the switching terminal may be in contact with the second terminal 150. In addition, when the battery 200 for supplying a main power is connected to the main body 100, as illustrated in FIG. 4, the switching terminal is pressed together with the first terminal 140 by the connection terminal 210 of the battery 200 for supplying a main power so as to deform a shape thereof, and may be disconnected from the second terminal 150.

Preferably, as illustrated in FIGS. 3 and 4, the switching terminal 130 is formed in a reverse "U" shape by bending, and due to having self-elasticity, is in contact with the second terminal 150 while maintaining an original shape before applying an external force thereto. In this regard, the switching terminal may be configured in such a manner that, if an external force is applied thereto by the connection terminal 210 of the battery 200 for supplying a main power and the first terminal 140, the switching terminal is further bent so as to deform the shape thereof, and thereby being disconnected from the fixedly provided second terminal 150.

In addition, the first terminal 140 is formed by bending conductive metal having self-elasticity, and is provided by protruding at a point corresponding to the connection terminal 210 of the battery 200 for supplying a main power. The first terminal may be configured in such a manner that, when being pressed by the connection terminal 210 of the battery 200 for supplying a main power, the first terminal is pushed inside of the main body 100 so as to contact with the switching terminal 130. Preferably, as illustrated in FIGS. 3 and 4, the first terminal is formed by bending in a triangular shape, which is the similar shape to the battery connection terminal equipped in the conventional mobile phone.

The second terminal 150 is provided at a point corresponding to the switching terminal 130, and may be formed by bending in an "L" shape. The second terminal 150 is not deformed in a shape or a position thereof by pressing, thereby it is not necessary to have elasticity, and may be fixedly provided at the point corresponding to the switching terminal 130.

Figure 5:
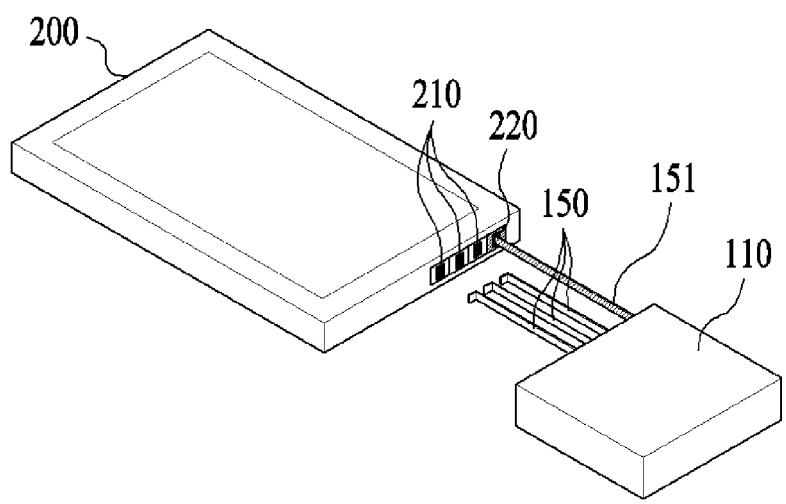
FIG. 5 is a perspective view illustrating a part of components of a portable electronic device having a power maintenance function during replacement of a battery according to another embodiment of the present invention.

FIG. 5 is a perspective view illustrating a part of components of a portable electronic device having a power maintenance function during replacement of a battery according to another embodiment of the present invention. As illustrated in FIG. 5, in the portable electronic device having a power maintenance function during replacement of a battery according to another embodiment of the present invention, the auxiliary power supply module 110 may further include a third terminal 151 which contacts with a connection terminal 220 of the battery 200 for supplying a main power, and may receive and store the power from the battery 200 for supplying a main power through the third terminal 151. It is also necessary to supply the power to the auxiliary power supply module 110. The auxiliary power supply module 110 may be charged by a separate charging module, however, since it requires only a low-capacity power, it may be configured so as to be supplied with a constant amount of power from the battery 200 for supplying a main power. In accordance with some embodiments, when supplying the power from the outside while the battery 200 for supplying a main power is connected to the main body, the auxiliary power supply module may be configured to receive and store the power through the battery 200 for supplying a main power, the connection terminal 220 and the third terminal 151.

The above-described present invention may be variously modified or applied by those having a common knowledge in the technical field to which the present invention pertains, and the scope of technical concept according to the present invention should be defined by the following claims.

The invention claimed is:

1. A portable electronic device having a power maintenance function during replacement of a battery, the portable electronic device comprising:
   a main body which forms an appearance of a portable electronic device; and
   a battery for supplying a main power which is detachably connected to the main body, and is configured to be charged by an external power and supply the main power to the portable electronic device,
   wherein the main body comprises:
      an auxiliary power supply module which is fixedly provided inside of the main body, and is configured to supply an auxiliary power to the portable electronic device, when the battery is separated from the main body;

a power control circuit configured to control a power supply to the portable electronic device;

a switching terminal configured to connect the power control circuit with the battery or the auxiliary power supply module;

a first terminal configured to, when the battery is connected to the main body, contact a connection terminal of the battery and the switching terminal to connect the battery with the power control circuit; and a second terminal which is provided in the auxiliary power supply module to be connected therewith, and is configured to, when the battery is separated from the main body, contact the switching terminal to connect the auxiliary power supply module with the power control circuit, wherein the second terminal is not deformed in a shape when the battery is separated from the main body and when the battery is connected to the main body, wherein the power control circuit controls the power supply to the portable electronic device when the switching terminal contacts any one of the battery for supplying the main power and the auxiliary power supply module; and the switching terminal is formed by bending conductive metal having self-elasticity, is configured to, when the battery is separated from the main body, be in contact with the second terminal after being in disconnected with the first terminal, and is configured to, when the battery is connected to the main body, be pressed together with the first terminal by the connection terminal of the battery so as to deform a shape thereof, and be disconnected from the second terminal.

2. The device according to claim 1, wherein the first terminal is formed by bending conductive metal having self-elasticity;

the first terminal is provided by protruding at a point corresponding to the connection terminal of the battery; and the first terminal is configured to, when being pressed by the connection terminal of the battery, be pushed inside of the main body so as to contact the switching terminal.

3. The device according to claim 1, wherein the second terminal is provided at a point corresponding to the switching terminal, and is formed by bending in an "L" shape.

4. The device according to claim 1, wherein the auxiliary power supply module further comprises a third terminal which contacts the battery; and the auxiliary power supply module is configured to receive and store a power from the battery through the third terminal.

5. The device according to claim 1, wherein the auxiliary power supply module is to store the power to an extent of maintaining the power-on state of the portable electronic device for 10 to 30 seconds.

6. The device according to claim 1, wherein the first terminal comprises a plurality of the first terminals, the second terminal comprises a plurality of the second terminals, and the switch terminal comprises a plurality of the switch terminals.

7. A portable electronic device comprising:

a battery for supplying a main power to the portable electronic device via a connection terminal; and a main body to which the battery is detachably connected, the main body comprising:

an auxiliary power supply module provided inside of the main body to supply an auxiliary power to the portable electronic device when the battery is separated from the main body;

a power control circuit to control a power supply to the portable electronic device;

a switching terminal connecting the power control circuit with the battery or the auxiliary power supply module, the switching terminal having self-elasticity;

a first terminal having self-elasticity connected with the battery when the battery is connected to the main body;

a second terminal connected with the auxiliary power supply module when the battery is separated from the main body, wherein, when the battery is separated from the main body, the first terminal is not in contact with the switching terminal, and the second terminal is in contact with the switching terminal; and when the battery is connected to the main body, the battery presses the first terminal toward the switching terminal, and the pressed first terminal presses the switching terminal to deform the switching terminal, thereby making the switching terminal be disconnected from the second terminal.

8. The device according to claim 7, wherein the auxiliary power supply module further comprises a third terminal which contacts with the battery; and the auxiliary power supply module is configured to receive and store a power from the battery through the third terminal.

9. The device according to claim 7, wherein an end of the switching terminal is bent to form a U shape;

when the battery is separated from the main body, the bent end is in contact with the second terminal; and when the battery is connected to the main body, the pressed first terminal presses the bent end to make the bent end be not in contact with the end of the second terminal.

10. The device according to claim 7, wherein the second terminal has no elasticity so that the second terminal is not deformed when the battery is separated from the main body, and when the battery is connected with the main body.

11. The device according to claim 7, wherein the first terminal comprises a plurality of the first terminals, the second terminal comprises a plurality of the second terminals, and the switch terminal comprises a plurality of the switch terminals.

* * * * *